July 25, 1939.  E. ARMBRUSTER  2,167,229
RANGE FINDER
Filed June 26, 1937  2 Sheets-Sheet 1
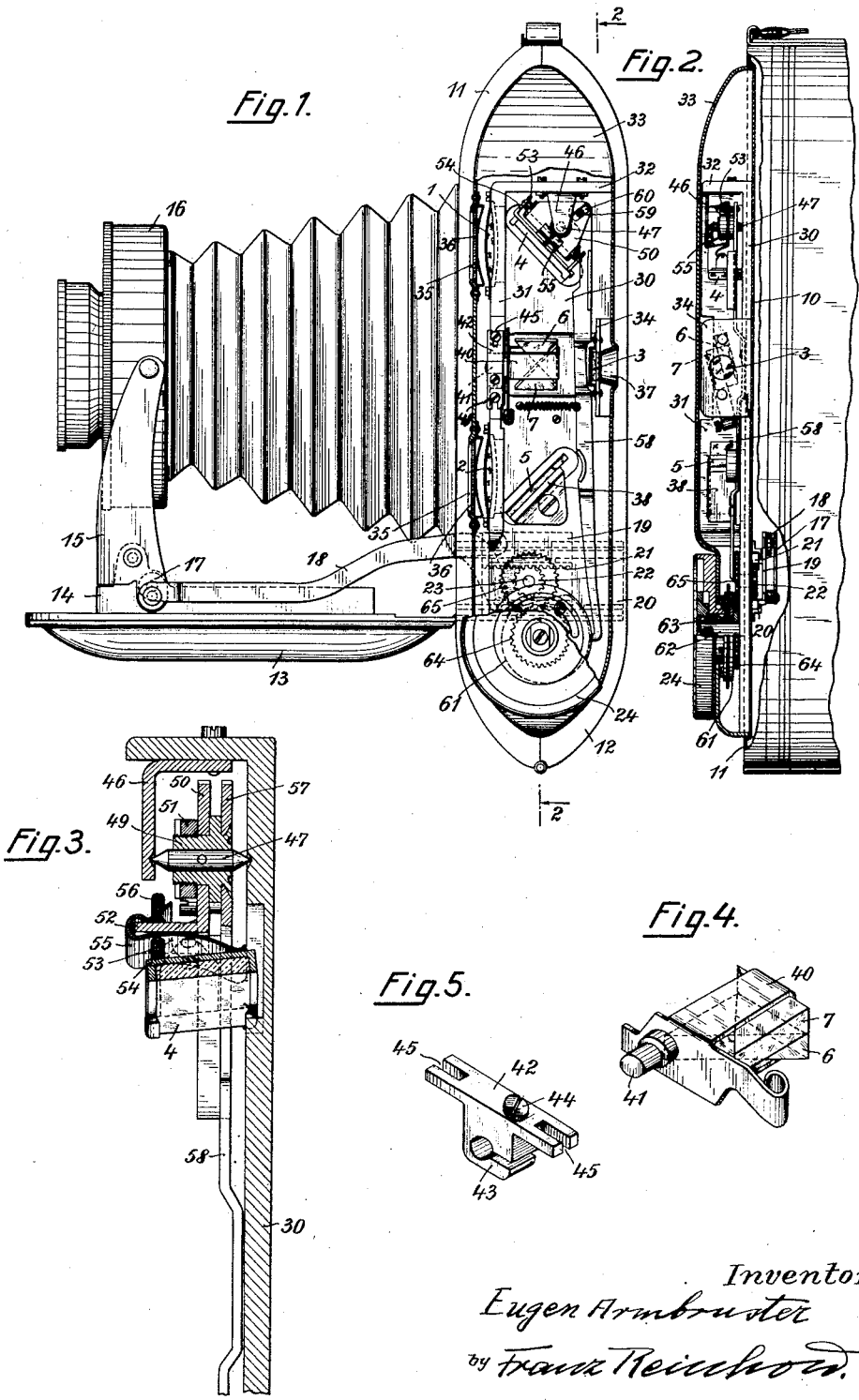
Inventor:
Eugen Armbruster
by Frank Reichhold
Attorney.

July 25, 1939.　　　　E. ARMBRUSTER　　　　2,167,229
RANGE FINDER
Filed June 26, 1937　　　　2 Sheets-Sheet 2

Inventor:
Eugen Armbruster
by Frank Reichold
Attorney.

Patented July 25, 1939

2,167,229

UNITED STATES PATENT OFFICE 2,167,229

RANGE FINDER

Eugen Armbruster, Bergisch-Gladbach, Germany, assignor to Voigtlander & Sohn Aktiengesellschaft, Brunswick, Germany, a joint-stock company of Germany Application June 26, 1937, Serial No. 150,533
In Germany March 23, 1935

3 Claims. (Cl. 88—2.7)

My invention relates to improvements in photographic or cinematic cameras, and more particularly in cameras of the type in which a range finder is provided which consists of a pair of object lenses located at the ends of a base line, an ocular lens common to both of the said object lenses, and a system of mirrors, whereby pencils of rays emanating from complementary parts of the object to be photographed and passing through the said object lenses are combined and directed through the said ocular lens, means being provided for setting said system of mirrors in accordance with the distance of the object, so that the said complementary pencils are combined into a single pencil correctly representing the object to be photographed. In systems of this type only sections of the object lenses located respectively at opposite sides of the base line of the range finder are operative for transmitting the rays from the object to the system of mirrors and the ocular lens.

The object of the improvements is to provide a photographic camera of the class indicated in which the space needed for mounting the range finder is reduced, and with this object in view my invention consists in disposing the range finder so that its base line is inclined relatively to the horizontal or vertical plane passing through the camera so far that the said operative sections of the object lenses are located with their centers in the horizontal or vertical plane of the camera.

For the purpose of explaining the invention an example embodying the same has been shown in the accompanying drawings in which the same reference characters have been used in all the views to indicate corresponding parts.

In said drawings—

Fig. 1 is an elevation of the camera partly in section,

Fig. 2 is a sectional elevation taken on the line 2—2 of Fig. 1,

Figure 6:
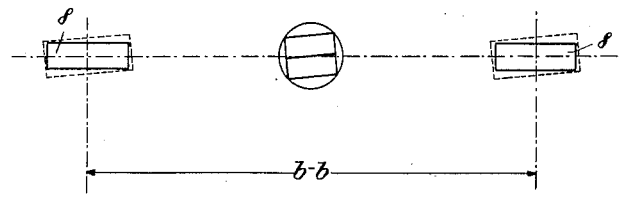
Figure 7:
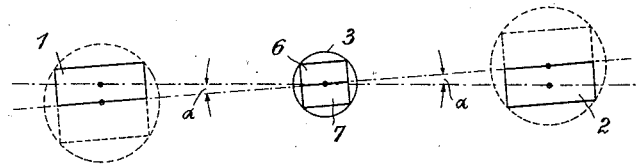
Figure 8:
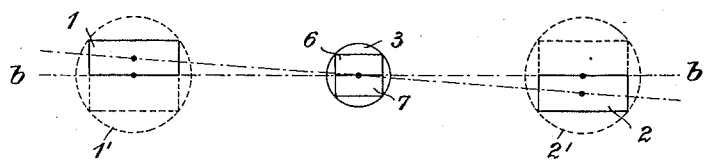
Figure 9:
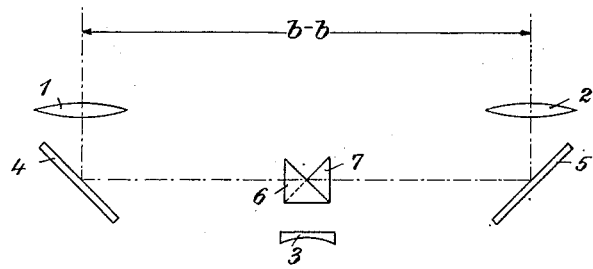

Fig. 3 is a sectional elevation on an enlarged scale showing the mounting of the adjustable mirror of the range finder, Figs. 4 and 5 are perspective views showing respectively the mounting of the crossing mirrors and the bearing block of the said mounting, Fig. 6 is a diagrammatical elevation showing the optical system, Figs. 7 and 8 are similar diagrammatical elevations of the optical system illustrating the principle of the invention, and Fig. 9 is a diagrammatical plan view of the optical system.

In the figures I have shown a range finder which comprises two positive object lenses 1, 2 located at the ends of the base line b—b, a negative ocular lens 3, and a reflecting system comprising a pair of mirrors 4 and 5 located respectively in the paths of the rays passing through the positive lenses 1 and 2 and inclined relatively to the said paths substantially at angles of 45°, the said mirrors being adapted to reflect the pencils of rays towards each other. Between the mirrors 4 and 5 and in front of the negative lens 3 there are two sectional mirrors 6 and 7 disposed one above the other and crossing each other at angles of 90°, the said sectional mirrors 6 and 7 being in positions for reflecting sectional pencils of rays emanating from complementary portions of the object to be photographed and passing through the object lenses 1 and 2 and reflected by the mirrors 4 and 5, the said reflected sectional pencils of rays passing through the ocular lens 3, where they are combined into a single pencil. One of the mirrors 4 and 5 is adapted to be turned about an axis disposed perpendicularly to the plane of the paths of the pencils of rays passing through the lenses 1, 2 and reflected by the mirrors 4 and 5, whereby the said mirror may be set at different angles in accordance with the distance of the object to be photographed and so that the sectional pencils are combined into a pencil correctly representing the said complementary portions of the object to be photographed. The angle through which the said mirror is thus turned about its axis is used for measuring the distance of the object, as is known in the art.

In Fig. 8 I have shown a range finder of the class referred to and disposed with its base line horizontal, as is now usual. In dotted lines I have indicated circular negative lenses 1' and 2'. By the mirrors 6 and 7 only sections of the pencils of rays passing through the object lenses 1' and 2' and reflected by the mirrors 4 and 5 are reflected, the other sections of the said pencils being reflected on the rear faces of the mirrors 6 and 7 and thus being inoperative, and for this reason it has heretofore been proposed to provide only sectional object lenses 1, 2 and sectional mirrors 4 and 5, the said object lenses and mirrors being located at opposite sides of the base line b—b of the range finder. Thus it will be understood that the dimension of the range finder taken perpendicularly to the base line is unnecessarily large, so that much room is needed in the camera casing for accommodating the range finder. Ordinarily the object lenses are rectangular in shape.

In my improved camera this waste of space is avoided, and for this purpose the range finder as a whole is inclined relatively to the said vertical or horizontal plane at an angle α, as is indicated in Fig. 7, the said angle being such that the centers of the sectional object lenses 1, 2 and mirrors 4, 5 are located in the said vertical or horizontal plane. As appears from Fig. 7 also the sectional mirrors 6, 7 are inclined relatively to the said planes at the angle α.

In view of a sightly appearance I prefer to dispose the rectangular holes 8 which are made in the front wall of the camera casing for permitting the passage of the rays to the range finder with their sides parallel to the vertical and horizontal planes of the camera, as is shown in Fig. 6.

In the description of the diagrammatical views Figs. 6 to 9 the range finder is assumed to be mounted on the horizontal top wall of the camera. In the practical embodiment shown in Figs. 1 to 5 the range finder is mounted on one of the vertical side walls of a camera casing comprising a body 11, a rear member 12 hinged thereto, and a bed or base board 13 hinged to the body 11. On the said base board a camera front 14 is slidable which is provided with upwardly directed hinged arms 15 carrying the lens board 16, and the said camera front and lens board are connected respectively by links 17 and 18 to a slide 19 mounted in guide ways 20 fixed to one of the side walls of the body. The said slide is provided with a rack 21 engaged by a gear wheel 22 fixed to a spindle 23 mounted in the said side wall and adapted to be rotated, together with a range finder setting mechanism from a milled disk 24, as will be described hereinafter. By shifting the slide inwardly and outwardly in accordance with the setting of the range finder the object lens is adjusted to effect focusing. The links 17 and 18 and the arms 15 are constructed so that the lens board and the object lens carried thereby are automatically folded inwardly when the camera bed or base board is being closed. This mechanism is known in the art, and it does not form a part of the present invention. It has been described in the U. S. patent to Barenyi, No. 2,033,506 dated March 10, 1936.

The operative parts of the range finder are mounted on a base plate 30 fixed to the said side wall and which is formed at its front and top sides with laterally directed flanges 31 and 32, and the range finder is confined within a cover 33 fixed to the said side wall of the camera.

On the base plate 30 the mirrors 4, 5, 6 and 7 and the lenses 1, 2 and 3 are mounted. The positive lenses 1 and 2 are located in cut-out portions of the flange 31, and the negative lens 3 is mounted in a cut-out portion of a plate 34 secured to the base plate 30. In front of the lenses 1 and 2 the side wall of the cover 33 is formed with cut-out portions 35 which are closed by glass plates 36. At the rear of the negative lens 3 the rear wall of the cover 33 is provided with a peep hole 37.

The fixed mirror 5 is carried by a mounting 38 fixed to the base plate 30. The mirrors 6 and 7 are mounted in a frame 40 providing a rectangular chamber in which the mirrors 6 and 7 are located (Fig. 4). The said frame is made integral with a pivot bolt 41 by means of which it is adjustably secured to a bearing block 42, the said bearing block comprising a slotted spring portion 43 in which the pivot bolt 41 is mounted, the said spring portion being adapted to be clamped by means of a clamping screw 44 (Fig. 5). Laterally directed slotted arms 45 of the block 42 are adapted to be engaged by screws 46 by means of which the block is fixed to the flange 31. Thus the bearing block 42 is adapted to be shifted longitudinally of the flange 31, and the frame 40 is adapted to be turned about the pivot bolt 41 for adjusting the mirrors 6 and 7 relatively to the mirrors 4 and 5.

The mounting of the pivotal mirror 4 is shown on an enlarged scale in Fig. 3. It is pivotally mounted by means of a bolt 47 mounted on the base plate 30 and a bracket 48 fixed thereto. To the said pivot bolt a hub 49 is secured, and to the said hub a plate 50 is fixed by means of a screw nut 51. The said plate 50 is made integral with a flange 52 and a pair of eyes 53, and in the said eyes a plate 54 is pivotally mounted which has the mirror 4 fixed thereto. To the flange 52 a leaf spring 55 is fixed which engages with its free end one end of the plate 54. In a screw-threaded bore of the flange 52 a screw 56 is mounted which engages one end of the plate 54, the said screw and leaf spring 55 cooperating for adjusting the angular position of the mirror resulting from the displacement of the base line described above and illustrated in Fig. 2.

To the hub 49 a second plate 57 is secured which is made integral with an arm 58. The plates 50 and 57 are adapted to be adjusted relatively to each other and fixed in position by means of a screw 59 engaging in a slot 60 of the plate 50. The arm 58 extends downwardly from the mounting of the mirror 4 into position for engagement with a cam disk 61 secured to a hub 63 loosely mounted on a pivot bolt 62 and carrying the milled disk 24. The bolt 62 is fixed to the base plate 30. On the said pivot bolt a gear wheel 64 is mounted which is fixed to the cam disk 61, and which is in mesh with a gear wheel 65 connected with the aforesaid gear wheel 22.

From the foregoing description the manner of using the range finder will be readily understood. The operator looks through the ocular lens 3, and ordinarily he will find that the portions of the object to be photographed are displaced with relation to each other. For bringing the said portions into correct positions he turns the milled disk 24. Thereby the cam disk 61 turns the arm 58 and the mounting of the mirror 4 about the axis of the pivot bolt 47. Thus the angular position of the mirror 4 is changed in accordance with the object to be photographed. The rotary movement of the milled disk 24 is transmitted through the gear wheels 64, 65 and 22 to the slide 19 which is thereby shifted inwardly or outwardly, together with the camera front, for focusing the object lens.

In the claims the term "main plane" of the camera is understood to be either the horizontal plane passing through the optical axis or a vertical plane disposed perpendicularly of the said optical axis, according as the range finder is mounted on the horizontal top wall of the camera casing, as is shown in Figs. 6 to 9, or on a vertical side wall, as is shown in Figs. 1 to 5.

While in describing the invention reference has been made to a particular example embodying the same, I wish it to be understood that my invention is not limited to the construction shown in the drawings. More particularly I wish it to be understood that my invention is not limited to the type of the range finder shown in the drawings and comprising positive object lenses and a negative ocular lens, or to a range finder in which the ocular lens is located at the rear of the crossing mirrors 6, 7.

I claim:

1. A range finder, comprising a base plate, a pair of mirrors spaced from each other and adapted to reflect pencils of rays emanating from an object towards each other, a pair of mirrors crossing each other and located respectively in the paths of the pencils of rays reflected by said spaced mirrors in such positions as to combine the said pencils into a pencil representing the object, means for setting one of said spaced mirrors in accordance with the distance of the object, the optical system of said range finder being inclined relatively to said base plate so far that the centers of the operative portions of said spaced mirrors are located substantially on a line parallel to said base plate, an integral frame in which both said crossing mirrors are mounted, said frame being pivotally mounted on said base plate on an axis substantially parallel to the direction of the rays reflected by said crossing mirrors, and means for fixing said frame in position on said base plate.

2. A range finder as claimed in claim 1, comprising a bearing block on said base plate formed with a slit sleeve, a trunnion on said frame engaged in said sleeve, and a screw for clamping said trunnion within said sleeve.

3. A range finder, comprising a base plate, a pair of mirrors spaced from each other and adapted to reflect pencils of rays emanating from an object towards each other, a pair of mirrors crossing each other and located respectively in the path of the pencils of rays reflected by said spaced mirrors in such positions as to combine the said pencils into a pencil representing the object, means for setting one of said spaced mirrors in accordance with the distance of the object, the optical system of said range finder being inclined relatively to said base plate so far that the centers of the operative portions of said spaced mirrors are located substantially on a line parallel to the said base plate, a shaft pivotally mounted in bearings fixed to said support, a plate fixed to said shaft and having a flange at right angles thereto, a plate carrying said mirror and pivotally mounted on said flange, a U-shaped leaf spring carried by and straddling said flange and acting on said plate carrying the mirror, a set screw screwing in said flange and engaging said plate carrying the mirror and also passed through holes made in said leaf spring for holding the same in position, and means to rotate said shaft for setting the mirror in accordance with the range to be measured.

EUGEN ARMBRUSTER.